US008913317B2

(12) United States Patent
Seyfried et al.

(10) Patent No.: US 8,913,317 B2
(45) Date of Patent: Dec. 16, 2014

(54) METHOD AND DEVICE FOR ILLUMINATING A SAMPLE IN A LASER MICROSCOPE

(75) Inventors: Volker Seyfried, Nussloch (DE); Hilmar Gugel, Dossenheim (DE); Carsten L. Thomsen, Virum (DK)

(73) Assignee: Leica Microsystems CMS GmbH, Wetzlar (DE)

( * ) Notice: Subject to any disclaimer, the term of this patent is extended or adjusted under 35 U.S.C. 154(b) by 909 days.

(21) Appl. No.: 12/674,343

(22) PCT Filed: Aug. 11, 2008

(86) PCT No.: PCT/EP2008/060508
§ 371 (c)(1),
(2), (4) Date: Apr. 20, 2010

(87) PCT Pub. No.: WO2009/024490
PCT Pub. Date: Feb. 26, 2009

(65) Prior Publication Data
US 2011/0279890 A1 Nov. 17, 2011

(30) Foreign Application Priority Data
Aug. 21, 2007 (DE) .......................... 10 2007 039 498

(51) Int. Cl.
G02B 21/08 (2006.01)
H01S 3/131 (2006.01)
H01S 4/00 (2006.01)
G02B 21/00 (2006.01)

(52) U.S. Cl.
CPC .................................. G02B 21/0032 (2013.01)
USPC ....... 359/388; 359/333; 359/389; 372/29.015

(58) Field of Classification Search
USPC .......... 362/552, 553; 359/333, 388, 389, 385; 372/29.011, 29.015
See application file for complete search history.

(56) References Cited

U.S. PATENT DOCUMENTS 3,782,823 A * 1/1974 Kantorski et al. ............ 356/318
4,555,620 A * 11/1985 Bridson et al. ............... 250/205
(Continued)

FOREIGN PATENT DOCUMENTS

| DE | 101 15 509 A1 | 12/2001 |
| DE | 101 15 589 A1 | 12/2001 |
| EP | 0 368 309 A2 | 5/1990 |
| EP | 0 435 111 A2 | 7/1991 |
| EP | 0 548 451 A2 | 6/1993 |

OTHER PUBLICATIONS

Carlsson et al., "Method for intracellular imaging of ion concentrations using confocal microscopy and fluorophore lifetimes", Proceedings of SPIE 3919, Three-dimensional and multidimensional microscopy: image acquisition processing VII, 30 ( May 2, 2000).*

*Primary Examiner* — Eric Bolda
(74) *Attorney, Agent, or Firm* — Foley & Lardner LLP

(57) ABSTRACT

The invention relates to a method and a device for illuminating or irradiating an object, a sample (8), or the like, for the purpose of imaging or analysis, particularly for use in a laser microscope (1), preferably in a confocal microscope having a laser light source (2) emitting the illuminating light, the laser light being coupled directly or by means of a glass fiber into an illumination light path (4), characterized in that the laser light source (2) is switched on rapidly upon a trigger signal directly prior to the actual need, for example, directly prior to imaging.

24 Claims, 2 Drawing Sheets

(56) References Cited

U.S. PATENT DOCUMENTS

Figure 1:
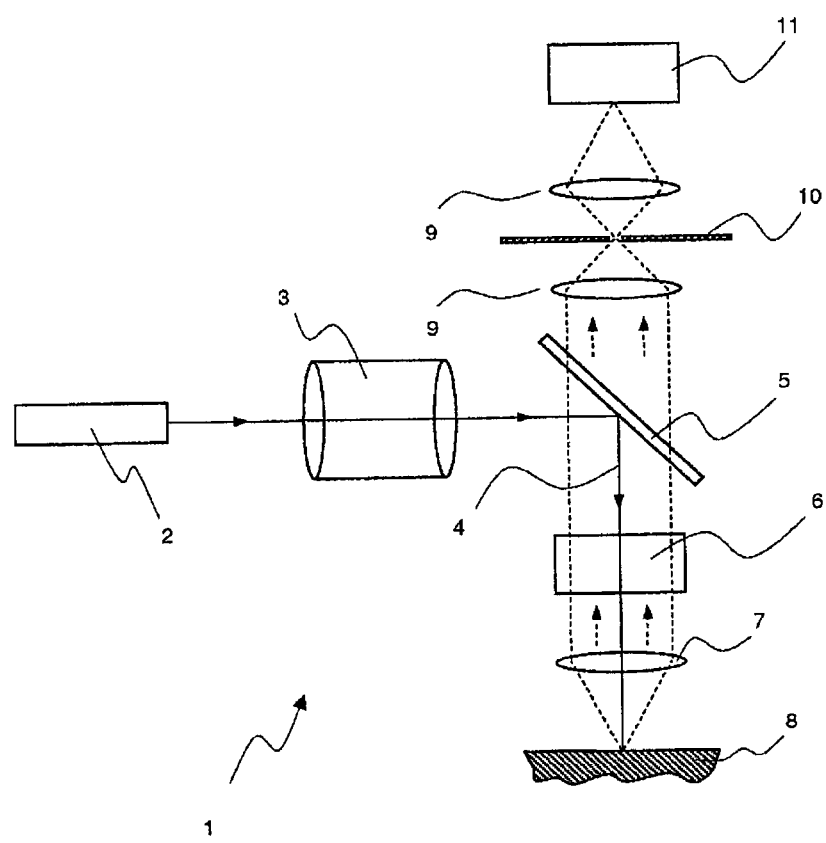

| | | |
|---|---|---|
| 5,757,831 A * | 5/1998 | Kmetec et al. ............ 372/29.011 |
| 6,224,589 B1 * | 5/2001 | Brenner et al. ................. 606/10 |
| 2005/0139748 A1 * | 6/2005 | Kitahara .................... 250/201.3 |
| 2006/0291511 A1 * | 12/2006 | Lan et al. .................... 372/38.01 |
| 2007/0041083 A1 * | 2/2007 | Di Teodoro et al. .......... 359/333 |
| 2007/0297049 A1 * | 12/2007 | Schadwinkel et al. ........ 359/385 |
| 2009/0086315 A1 | 4/2009 | Birk et al. |

* cited by examiner

METHOD AND DEVICE FOR ILLUMINATING A SAMPLE IN A LASER MICROSCOPE

The present invention relates to a method for illuminating or irradiating an object, sample, or the like, for the purpose of imaging or analysis, particularly for use in a laser microscope, preferably in a confocal microscope, having a laser light source which emits the illuminating light, the laser light being coupled directly or via a glass fiber into an illumination beam path. The present invention also relates to a device for this purpose.

Very generally, the present invention is directed to a method and device for illuminating or irradiating an object, sample, or the like. Specifically, said method and device may be used in confocal microscopy. Confocal microscopes having conventional gas, solid-state, semiconductor or fiber lasers, and especially ones having white-light lasers, have been described in DE 101 15 589 A1 and DE 101 15 509 A1, for example.

It is already known in practice that in white-light lasers, it is possible to generate what is known as a supercontinuum with the aid of a photonic glass fiber, a photonic bandgap fiber, a tapered fiber, a holey fiber, a doped fiber, etc.

Also known in the field are triggerable pulsed lasers, such as TiSa lasers or lasers using SESAM (semiconductor saturable absorber mirror) technology.

Laser illumination systems are mostly expensive and their use is problematic in that every laser ages during use, for example because of gas degradation. Furthermore, the optics, the resonator, active media, etc., age because of thermal stresses. When laser light is coupled into a glass fiber, for example in a white-light laser, resulting in light-induced stress, the photonic glass fiber deteriorates, which manifests itself as a gradual decrease in output power over the useful life.

With regard to the aging of the laser, or the process of a glass fiber becoming opaque over its life, it is remarkable that in most laser light applications, and especially in laser scanning microscopy, the illuminating laser light is used only for a fraction of the time during which the laser is or remains permanently on. Normally, the laser light is only needed for the actual image acquisition, but not during the usually long intervals between image acquisitions.

It is already known in practice to operate the laser light source continuously, while protecting the optical fiber and/or optical components in the illumination beam path, which are subject to aging. In a continuously operated laser light source, this is accomplished by shutters, EOM, AOM, AOTF, etc., which are used to block the laser light during the time that it is not needed for image acquisition. During this time, the laser remains on at full power.

Turning off the laser light source is not useful for reducing the deterioration of the laser light source, because after the laser is turned on again, it needs a quite considerable amount of time until it is operational again and able to operate in a stable regime.

It is, therefore, an object of the present invention to provide a method and device for illuminating or irradiating an object, sample, or the like, for the purpose of imaging or analysis, whereby the components that are sensitive in terms of the life of the laser, in particular, are substantially protected from deterioration, especially when the laser is to remain operational, but the laser light is not continuously needed.

The aforementioned object is achieved by the features of independent claims 1 and 13.

Accordingly, the method of the above-mentioned type has the feature that the laser light source is turned on very rapidly in response to a trigger signal immediately before it is actually needed, such as immediately prior to image acquisition.

Accordingly, in a device of the above-mentioned type, the aforementioned object is achieved because the laser light source is capable of being turned on very rapidly in response to a trigger signal immediately before it is actually needed, such as immediately prior to image acquisition.

In accordance with the present invention, it has been discovered that it is possible to turn on the laser light source as rapidly as possible immediately before it is actually needed, such as immediately prior to image acquisition, or prior to performing analysis. Turning on of the laser light source occurs extremely rapidly in response to a trigger signal. This ensures that the laser will be on only when the confocal microscope, for example, is actually acquiring images. When the laser light is not needed, the laser light source can be turned off, either manually or automatically, preferably after a certain delay.

The trigger signal used to turn on the laser light source may be initiated manually or automatically by hardware or software. If the device using the laser light source is a microscope, the trigger signal needed to turn on the laser light source is transmitted thereto when the user, prior to the actual image acquisition, starts or has started to prepare the image acquisition. The trigger signal causes the laser light source to be turned on. Turning on of the laser light source preferably occurs within less than $1/10$ of a second, so that the turn-on process, or the time until the laser light source operates in a trouble-free and stable manner, is not perceived as disturbing by the user.

Turning on of the laser light source is accomplished by a pump source of the laser light source, said pump source preferably being in the form of a pump diode. This pump source is energized, thereby activating the laser; i.e., the laser light source.

Fast turn-on is particularly advantageously implemented using a control system having a control loop which controls the pump source current as a function of the output power of the laser light source. To this end, the control system includes a photodiode, preferably one known as a monitor photodiode, for detecting the output power of the laser light source. The signal detected there is analyzed and used as a controlled variable for the control loop.

Further advantageously, to ensure extremely fast turn-on while avoiding the occurrence of long transient or stabilization processes in the laser light source, there is provided a continuously operated or energized seed laser and at least one laser amplifier disposed downstream thereof. Thus, the laser light source includes the continuously operated seed laser as well as the laser amplifier, which can be turned on as needed. Because the seed laser is continuously energized, stable conditions are achieved for the generation of the laser radiation. Rapid switching of the radiation is accomplished by turning on or energizing the pump source for the laser amplifier. A trigger or trigger signal indicates that laser light is needed, thereby turning on the pump source for the amplifier unit, said pump source advantageously being in the form of a pump diode or pump diodes. Fast control of the output power for this intermittent operation is again generated via a monitor photodiode.

Particularly advantageously, the laser amplifier has two or more stages. More specifically, the laser amplifier includes at least one preamplifier and at least one power amplifier. In such an implementation, it is also beneficial if the laser amplifier or amplifiers downstream of the seed laser are activated by turning on or energizing the respective pump source, while the seed laser operates continuously.

Moreover, it is conceivable for the first stage of the amplifier unit to also be operated or energized continuously. Here, too, a control system having a control loop is provided, by which the current of the pump source of the amplifier unit is controlled as a function of the output power of the laser light source. Here, too, a photodiode, preferably a monitor photodiode, is provided for detecting the output power of the laser light source. It should be noted here that this control system can be the same control system that is required for controlling the pump light source of the seed laser. One single control system can be used to control both the energization of the pump source of the seed laser and that of the pump sources of the preamplifier and the power amplifier.

It should also be noted that splitting the laser light source or laser system is advantageous especially because the components that are sensitive in terms of the life of the laser are located in the laser amplifiers, or downstream of the laser amplifier. In accordance with the present invention, these critical components are operated only when they are actually needed. Therefore, the turning-on operations, i.e., the energization of the respective pump sources, are subjected to synchronization, for example, with the scanning operations of the confocal scanning microscope.

The method and device according to the present invention can be used particularly advantageously if downstream of the laser light generation, there are disposed nonlinear optical elements, such as frequency doublers or frequency multipliers, frequency mixers, frequency converters (OPOs, etc.), or spectral broadening elements, such as materials for self-phase modulation or cross-phase modulation, photonic crystals, photonic crystal fibers, supercontinuum-generating fibers (photonic, microstructured, suitably doped, or having natural negative group velocity dispersion). It is typical of all these above-mentioned elements that they require relatively powerful laser light sources, preferably ones that emit very short pulses of radiation. Therefore, it is not only the aging of the laser light source itself that is considerable, but in particular also the aging of the elements downstream of the actual laser light source.

In a preferred embodiment, the laser light source is intended for use in confocal microscopy, the laser light source being what is known as a supercontinuum laser, in which picosecond pulses of considerable energy (a cw power of 15 to 20 W at a repetition rate of 80 mHz) are coupled into a photonic crystal fiber to generate white light. In the presence of such pulse energy and average power levels, both the amplifier units of the laser and the supercontinuum fiber age relatively rapidly. Therefore, it is advantageous to split the laser light source into a continuously operated seed laser and a downstream two-stage amplifier unit. In such configuration, the seed laser is controlled via separate monitor photodiodes. In accordance with the above explanations, the first stage of the amplifier unit is operated continuously, while the second amplifier stage; i.e., the actual power stage, is energized and controlled via the pump diodes thereof, for example, upon activation of a scan button of the confocal microscope.

According to the teaching of the present invention, both the life of the power amplifier and that of the optical fiber, especially of a supercontinuum fiber, can be considerably increased, because the actual scan time in a conventional confocal microscope is usually in the range of from less than 5% to no more than 20% of the total operating time. Despite the requirement to turn on the power stage, sufficiently stable operation can be achieved within less than $1/10$ of a second, so that the "Lifetime Save Mode" implemented here is not perceived by the user at all, or least not as disturbing.

It should also be noted that in accordance with the present invention, it is conceivable for the laser to be turned off between individual image frames or lines acquired. In this manner, the time contributing to the aging process can be further reduced.

Further, it should be noted that the method and device according to the present invention can find application not only in confocal microscopes, but generally in systems where the time of operation of the laser illumination system is short compared to the [total] operating time. This is especially true for systems where it is not predictable when the laser illumination will actually be needed, and even more so because long standby times may be avoided in such systems.

Figure 2:
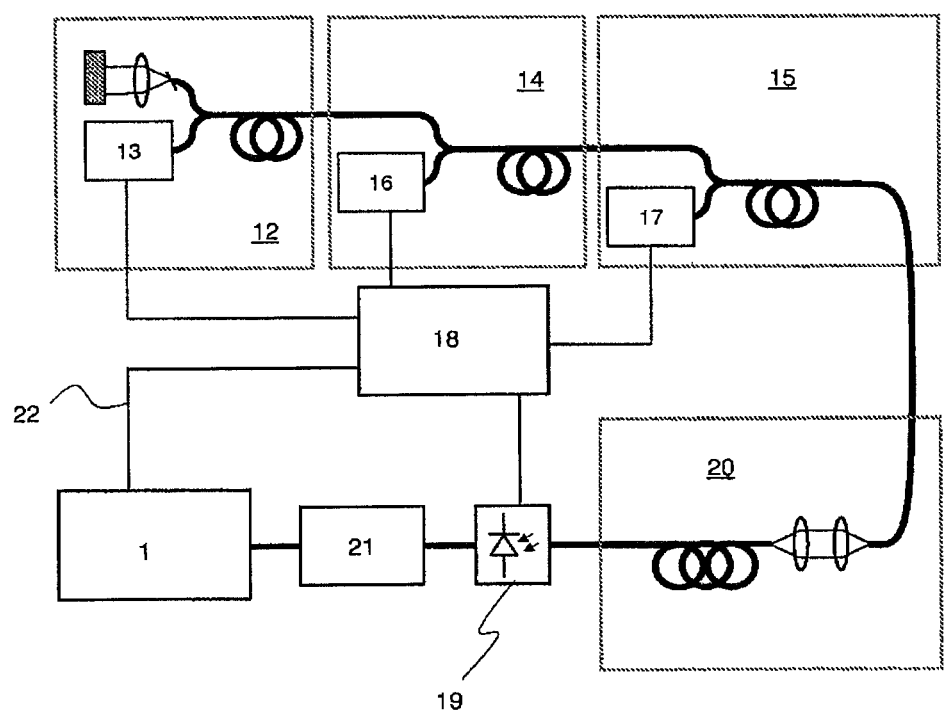

The teaching of the present invention may be advantageously embodied and refined in various ways. In this regard, reference is made, on the one hand, to the claims that are subordinate to claims 1 and 13 and, on the other hand, to the following description of a preferred exemplary embodiment of the invention which makes reference to the drawing. In conjunction with the description of the preferred exemplary embodiment of the present invention with reference to the drawings, an explanation is also given of generally preferred embodiments and refinements of the teaching. In the drawing:

FIG. 1 is a schematic view of the configuration and the optical path of a laser scanning microscope in which the device of the present invention uses the method of the present invention; and FIG. 2 is a schematic view of the basic design of a device according to the present invention for using the method according to the present invention in the optical path of a laser scanning microscope.

In FIG. 1, the use of a device according to the present invention and the application of a method according to the present invention are illustrated using the example of a laser scanning microscope 1. Illuminating light is emitted from a laser light source 2 and introduced into illumination beam path 4 of laser scanning microscope 1 via a beam shaper 3.

The illuminating light is directed by a beam splitter 5 through a scanning device 6, and is then focused through an objective 7 onto sample 8. The light returning from sample 8 (the greatest portion of which is detection light) goes through objective 7, scanning device 6 and beam splitter 5, and then passes through a lens system 9 and a pinhole 10 to detector 11.

Since in conventional laser scanning microscopes, the actual scan time is usually less than 5% of the total operating time, both laser light source 2 and optical elements disposed downstream thereof, and especially also the optical fibers used for coupling and injection purposes, age considerably.

FIG. 2 shows an exemplary embodiment of a device according to the present invention for illuminating or irradiating sample 8 in laser scanning microscope 1 shown in FIG. 1.

In accordance with the present invention, laser light source 2 is turned on rapidly in response to a trigger signal immediately before it is actually needed; i.e., immediately prior to image acquisition.

In the exemplary embodiment of a device according to the present invention shown in FIG. 2, laser light source 2 includes a seed laser 12 which is operated or energized continuously. The energization of seed laser 12 is accomplished by a pump source 13 individually associated with seed laser 12.

The actual laser amplifier is a two-stage configuration, including a preamplifier 14 and a power amplifier 15. Pump sources 16, 17 are associated with preamplifier 14 and power amplifier 15, respectively, to energize; i.e., to rapidly activate preamplifier 14 and power amplifier 15.

In the exemplary embodiment shown in FIG. 2, preamplifier 14 and seed laser 12 are operated continuously. This means that pump sources 13 and 16 energize seed laser 12 and preamplifier 14 continuously.

Pump sources 13, 16 and 17 are controlled or acted upon by a control system 18. Control system 18 includes a control loop which controls the current of the respective pump sources 13, 16 and 17 as a function of the output power of laser light source 2. A photodiode 19, or an array of such photodiodes, is provided for detecting the output power of laser light source 2, said photodiode or photodiodes preferably being in the form of a monitor photodiode or monitor photodiodes.

FIG. 2 further shows that laser light source 2 is operated as a supercontinuum laser with the aid of suitable means 20. Photodiode 19 is located downstream of these means 20 for purposes of power measurement. The power data obtained is fed to control system 18. The laser light is selected in wavelength by an AOTF 21 and coupled into the optical path of laser scanning microscope 1. From there, a trigger line 22 leads to control system 18, which in turn acts upon pump sources 13, 16 and 17.

Finally, it should be noted that the exemplary embodiment discussed above is merely intended to exemplify the claimed teaching, but not to limit it to such embodiment.

LIST OF REFERENCE NUMERALS 1 laser scanning microscope, laser microscope
2 laser light source
3 beam shaper
4 illumination beam path
5 beam splitter
6 scanning device
7 objective
8 sample
9 lens system
10 pinhole
11 detector
12 seed laser
13 pump source (of 12)
14 preamplifier
15 power amplifier
16 pump source (of 14)
17 pump source (of 15)
18 control system
19 photodiode
20 means for creating a supercontinuum laser
21 AOTF
22 trigger line

What is claimed is:

1. A method for illuminating or irradiating an object or a sample for the purpose of imaging or analysis, for use in a laser microscope having a laser light source which emits illuminating laser light, the laser light being coupled directly or via a glass fiber into an illumination beam path,
wherein the laser light source is turned on rapidly in response to a trigger signal immediately before it is actually needed, including immediately prior to image acquisition,
wherein turning on the laser light source is accomplished by energizing a pump source of the laser light source,
wherein a control system having a control loop controls a current of the pump source as a function of an output power of the laser light source, and
wherein the laser light source of the laser microscope includes a continuously operated or energized seed laser and at least one laser amplifier disposed downstream thereof.

2. The method as recited in claim 1,
wherein the trigger signal is initiated manually or automatically by hardware or software.

3. The method as recited in claim 2,
wherein the trigger signal is initiated by pressing a scan button of the microscope.

4. The method as recited in claim 1,
wherein turning on of the laser light source occurs within less than $1/10$ of a second.

5. The method as recited in claim 1,
wherein said pump source is in the form of a pump diode.

6. The method as recited in claim 5,
wherein the control system includes a photodiode for detecting the output power of the laser light source.

7. The method as recited in claim 1,
wherein the laser amplifier is a two-stage configuration, including at least one preamplifier and at least one power amplifier.

8. The method as recited in claim 1,
wherein the laser amplifier or amplifiers downstream of the seed laser are activated by turning on or energizing the respective pump source.

9. The method as recited in claim 7,
wherein the first stage of the laser amplifier is operated or energized continuously.

10. The method as recited in claim 8,
wherein the control system having a control loop controls the current of the pump source of an amplifier unit as a function of the output power of the laser light source; and
a photodiode is provided for detecting the output power of the laser light source.

11. A device for illuminating or irradiating an object or a sample for the purpose of imaging or analysis, for use in a laser microscope having a laser light source which emits illuminating laser light, the laser light being able to be coupled directly or via a glass fiber into an illumination beam path, said device being intended for carrying out the method according to claim 1,
wherein the laser light source can be turned on rapidly in response to a trigger signal immediately before it is actually needed, including immediately prior to image acquisition,
wherein turning on of the laser light source is accomplished by energizing a pump source of the laser light source,
wherein there is provided a control system having a control loop which controls current of the pump source as a function of the output power of the laser light source, and
wherein the laser light source of the laser microscope includes a continuously operated or energized seed laser and at least one laser amplifier disposed downstream thereof.

12. The device as recited in claim 11,
wherein the trigger signal is initiated manually or automatically by hardware or software.

13. The device as recited in claim 11,
wherein the trigger signal is initiated when pressing a scan button of the microscope.

14. The device as recited in claim 11,
wherein turning on of the laser light source occurs within a period of less than $1/10$ of a second.

15. The device as recited in claim 11,
wherein the pump source is in the form of a pump diode.

16. The device as recited in claim 11,
wherein the control system includes a photodiode for detecting the output power of the laser light source.

17. The device as recited in claim 11,
wherein the laser amplifier is a two-stage configuration, including at least one preamplifier and at least one power amplifier.

18. The device as recited in claim 11,
wherein the laser amplifier or amplifiers downstream of the seed laser can be activated by turning on or energizing the respective pump source.

19. The device as recited in claim 18,
wherein there is provided the control system having a control loop which controls the current of the pump source as a function of the output power of the laser light source, a photodiode being provided for detecting the output power of the laser light source.

20. The device as recited in claim 17,
wherein the first stage of the laser amplifier is operated or energized continuously.

21. The device as recited in claim 1,
wherein nonlinear optical elements are disposed in the illumination beam path which is downstream of the laser light generation.

22. The device as recited in claim 11,
wherein spectral broadening elements are disposed in the illumination beam path which is downstream of the laser light generation.

23. The device as recited in claim 11,
wherein the laser light source used is a supercontinuum laser; and
the laser light can be coupled into a photonic crystal fiber to generate white light.

24. The method as recited in claim 1,
wherein the laser microscope is a confocal microscope.

* * * * *